(12) United States Patent
Yamasaki

(10) Patent No.: US 7,084,909 B2
(45) Date of Patent: Aug. 1, 2006

(54) ELECTRONIC CAMERA, IMAGING SYSTEM AND IMAGING METHOD

(75) Inventor: Masafumi Yamasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 867 days.

(21) Appl. No.: 10/055,334

(22) Filed: Jan. 23, 2002

(65) Prior Publication Data

US 2002/0097327 A1    Jul. 25, 2002

(30) Foreign Application Priority Data

Jan. 24, 2001  (JP)  ............... 2001-015731
Jan. 24, 2001  (JP)  ............... 2001-015732

(51) Int. Cl.
*H04N 5/225*    (2006.01)
*H04N 7/00*    (2006.01)

(52) U.S. Cl. ............. 348/239; 348/36; 348/333.05; 348/333.11; 348/552

(58) Field of Classification Search ........... 348/552, 348/220, 239, 36, 207, 231.2, 333.05, 333.11
See application file for complete search history.

(56) References Cited

U.S. PATENT DOCUMENTS

| | | | | |
|---|---|---|---|---|
| 5,806,005 A * | 9/1998 | Hull et al. | .......... | 455/566 |
| 5,986,718 A * | 11/1999 | Barwacz et al. | .......... | 348/592 |
| 6,195,513 B1 * | 2/2001 | Nihei et al. | .......... | 396/332 |
| 6,324,521 B1 * | 11/2001 | Shiota et al. | .......... | 705/27 |
| 6,324,545 B1 * | 11/2001 | Morag | .......... | 707/202 |
| 6,441,850 B1 * | 8/2002 | Dotsubo et al. | .......... | 348/239 |
| 6,573,927 B1 * | 6/2003 | Parulski et al. | .......... | 348/32 |
| 6,812,962 B1 * | 11/2004 | Fredlund et al. | .......... | 348/207.1 |
| 2001/0024236 A1 * | 9/2001 | Sato et al. | .......... | 348/239 |
| 2003/0090572 A1 * | 5/2003 | Belz et al. | .......... | 348/207.1 |

FOREIGN PATENT DOCUMENTS

| | | |
|---|---|---|
| JP | 8-154201 | 6/1996 |
| JP | 11-4375 | 1/1999 |
| JP | 11-8831 | 1/1999 |
| JP | 11-331668 | 11/1999 |

* cited by examiner

*Primary Examiner*—Ngoc-Yen Vu
*Assistant Examiner*—Gary C. Vieaux
(74) *Attorney, Agent, or Firm*—Straub and Pokotylo; John C. Pokotylo

(57) ABSTRACT

An electronic camera comprises imaging means for imaging an image of an object, first image creating means for creating a first image based on the image imaged by the imaging means, operating means for setting information indicating a predetermined process, first transmission means for transmitting the first image and the information indicating the predetermined process to a center via a communication line, reception means for receiving an image transmitted from the center according to a processing result of the first image, display means for displaying the image received by the reception means, and second transmission means for transmitting to the center a second image having a larger number of pixels than an image corresponding to the first image.

12 Claims, 10 Drawing Sheets

ELECTRONIC CAMERA, IMAGING SYSTEM AND IMAGING METHOD

CROSS-REFERENCE TO RELATED APPLICATIONS

This application is based upon and claims the benefit of priority from the prior Japanese Patent Applications No. 2001-015731, filed Jan. 24, 2001, and No. 2001-015732, filed Jan. 24, 2001, the entire contents of both of which are incorporated herein by reference.

BACKGROUND OF THE INVENTION

1. Field of the Invention

The present invention relates to an electronic camera capable of communicating with a center where a desired image processing is performed, an imaging system and an imaging method using the electronic camera.

2. Description of the Background Art

In recent years, there is proposed an imaging system, which connects an electronic camera (digital still camera) for imaging an object with a center (such as a photo laboratory) where a variety of image processings are performed via a communication line. For example, Jpn. Pat. Appln. KOKAI Publication No. 11-331668 proposes a camera image processing system, in which information relating to processing of the image taken with an electronic camera is sent together with image data to a laboratory and a desired image processing is performed based on the information. According to this system, by transmitting the information relating to a processing such as making a new years card to the laboratory beforehand, time of order of prints can be saved.

However, according to the above system, no distinction is made between an image for final storage at the laboratory (i.e., an image with a large number of pixels and a large data size) and an image for confirmation on the electronic camera. Therefore, there is a problem of taking a long time for communication and increasing cost, when work of receiving a processed image from the laboratory and confirming it on the electronic camera are repeated many times.

Meanwhile, Jpn. Pat. Appln. KOKAI Publication No. 11-8831 proposes a composite photograph system, which synthesizes a imaged image or a replayed image with a predetermined background image. Jpn. Pat. Appln. KOKAI Publication No. 11-4375 proposes an imaging apparatus, which takes a series of partially overlapping images and then synthesizes them to create so-called a panorama image. Further, Jpn. Pat. Appln. KOKAI Publication No. 8-154201 proposes an image synthesizing apparatus which synthesizes two kinds of images each having a different electric charge accumulation time from the other to create an image having a high dynamic range.

However, in each of above-mentioned conventional apparatuses, since these processing operations are performed in the electronic camera in spite of requiring highly advanced image processings, it takes long time for processing and the processing content and the performance is constrained. On the other hand, if the function of above-mentioned conventional art by connecting the electronic camera with a processing apparatus such as a personal computer via a cable is realized, it is difficult to perform real-time processing and taking a photograph at the same time because it is unhandy to carry about.

BRIEF SUMMARY OF THE INVENTION

An object of the present invention is to provide an electronic camera capable of easily realizing a level of performance and/or functions which have been difficult to achieve, by connecting and interactively associating the electronic camera with a center via a communication line. Another object of the present invention is to provide an imaging system and an imaging method using the electronic camera.

An electronic camera according to an aspect of the present invention is characterized by comprising: imaging means for imaging an image of an object; first image creating means for creating a first image based on the image imaged by the imaging means; operating means for setting information indicating a predetermined process; first transmission means for transmitting the first image and the information indicating the predetermined process to a center via a communication line; reception means for receiving an image transmitted from the center according to a processing result of the first image; display means for displaying the image received by the reception means; and second transmission means for transmitting to the center a second image having a larger number of pixels than an image corresponding to the first image.

An imaging system according to an aspect of the present invention is characterized by comprising an electronic camera for imaging an object and a center for processing an image, the electronic camera and the center being connected with each other via a communication line, in which the center includes: center-side reception means for receiving an image and an information indicating a predetermined process to be performed to the image; processing means for performing a predetermined process to the received image based on the information received by the center-side reception means; and center-side transmission means for transmitting a result of the processing performed by the processing means, and the electronic camera includes: imaging means for imaging an object; first image creating means for creating a first image based on an image imaged by the imaging means, operating means for setting information indicating a predetermined process, first camera-side transmission means for transmitting the first image and the information indicating the predetermined process to the center; camera-side reception means for receiving a result of the processing transmitted from the center; display means for displaying the processing result received by the camera-side reception means; and second camera-side transmission means for transmitting to the center a second image corresponding to the first image and having a larger number of pixels than the first image.

An imaging method according to an aspect of the present invention is an imaging method using an electronic camera connected via a communication line with a center to perform an image processing, and is characterized by comprising: imaging an object; creating a first image based on the imaged image; setting information indicating a predetermined image processing; transmitting the first image and an information indicating a content of the predetermined image processing to a center via a communication line; receiving a result of a processing transmitted from the center via the communication line, after a predetermined processing is preformed to the first image based on the information indicating the image processing in the center; displaying the processing result received; and transmitting to the center via the communication line a second image having a larger number of pixels than the image corresponding to the first image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

DETAILED DESCRIPTION OF THE INVENTION

Figure 1:
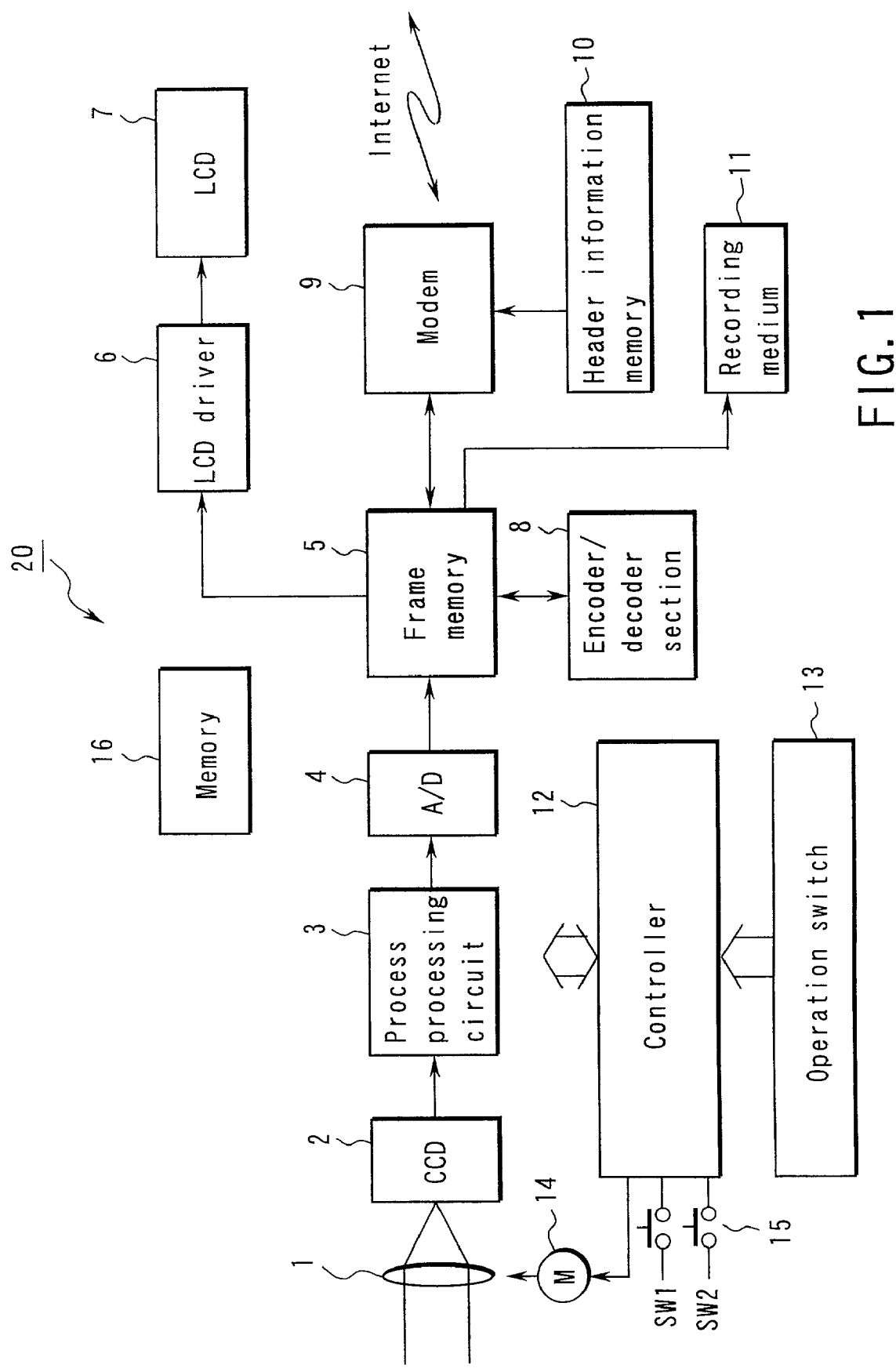
FIG. 1 is a block diagram showing a basic configuration of an electronic camera according to an embodiment of the present invention.

Hereinafter, a detail of the present invention will be described, based on an embodiment shown in the drawings.

FIG. 1 is a block diagram showing a basic configuration of an electronic camera according to an embodiment of the present invention.

In FIG. 1, reference numeral 1 represents a tube lens, reference numeral 2 represents a CCD imaging element which images an image of an object, reference numeral 3 represents a process processing circuit which performs such processes as color signal separation, gain control and gamma correction, reference numeral 4 represents an A/D converter, reference numeral 5 represents a frame memory for temporary storage of image data, reference numeral 6 represents an LCD driver, reference numeral 7 represents a liquid crystal display (LCD), reference numeral 8 represents an encoding/decoding circuit for compressing and decompressing the image data, reference numeral 9 represents a modulator/demodulator (modem) for data transmission and reception, reference numeral 10 represents a header information memory which stores a variety of header information concerning the image to be transmitted, reference numeral 11 represents a recording medium such as a compact flash memory and Smart Media (registered trademark), reference numeral 12 represents a controller (CPU) which controls each block, reference numeral 13 represents a variety of operation switches such as a power ON/OFF switch and a mode selector switch, and reference numeral 14 represents a motor for driving the tube lens 1.

Further, a release switch 15 includes a release first switch (SW1) and a release second switch (SW2). Switches SW1 and SW2 operate in association with a release operation. Specifically, the SW1 is turned on when a release button (not shown) is slightly pressed, and then SW2 is turned on when the button is pressed firmly. In the above steps of operation, when the SW1 is turned on, a command for establishing the communication line is executed, and when SW2 is turned on, an imaging operation is started.

With the beginning of the imaging operation, image data is temporarily stored in the frame memory 5. The image data is then compressed by the encoding/decoding circuit 8, under the control of the controller 12. Further, an image data transmitted from outside via the modem 9 by communication is stored in the frame memory 5, and then displayed on the LCD 7. It should be noted here that the image data inputted from outside is a reduced image data made from the original image data. The memory 16 stores non-image data, i.e. flag data and the like.

Figure 2:
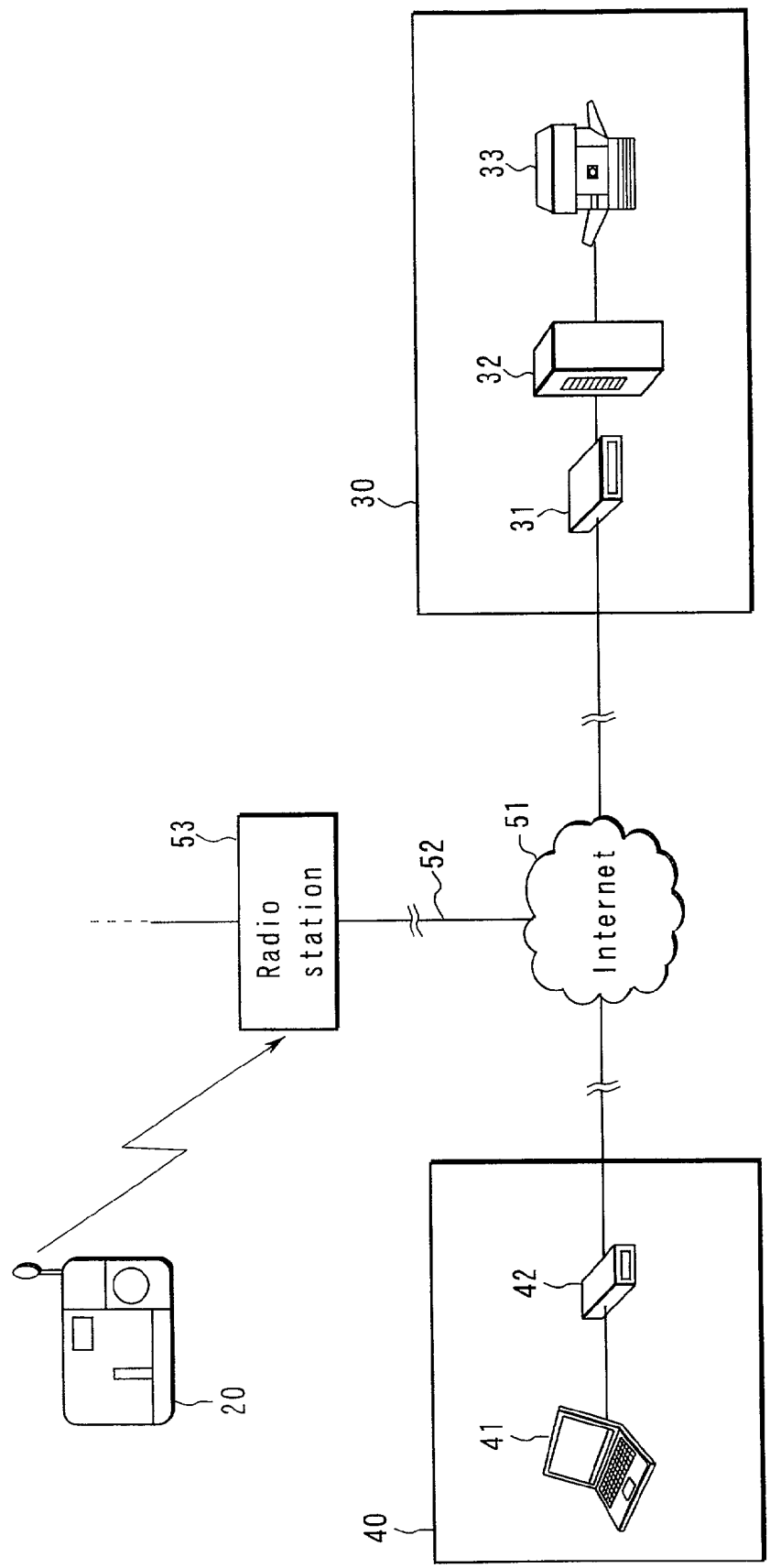
FIG. 2 is a figure showing an overall configuration of an imaging system using the electronic camera in FIG. 1.

FIG. 2 is a figure showing an overall configuration of an imaging system which uses the above-described electronic camera. A center 30 receives, stores, processes and prints the image data, includes a modem 31, a server 32, a printer 33 and the like, and is connected to the Internet via the modem 31. A center user terminal 40 includes a personal computer 41, a modem 42 and the like, and is connected with the Internet 51 via the modem 42. A plurality of radio stations 53 is connected with the Internet 51 via public telephone network 52,. The electronic camera 20 having the configuration shown in FIG. 1 is capable of communicating with the radio station 53.

Figure 3:
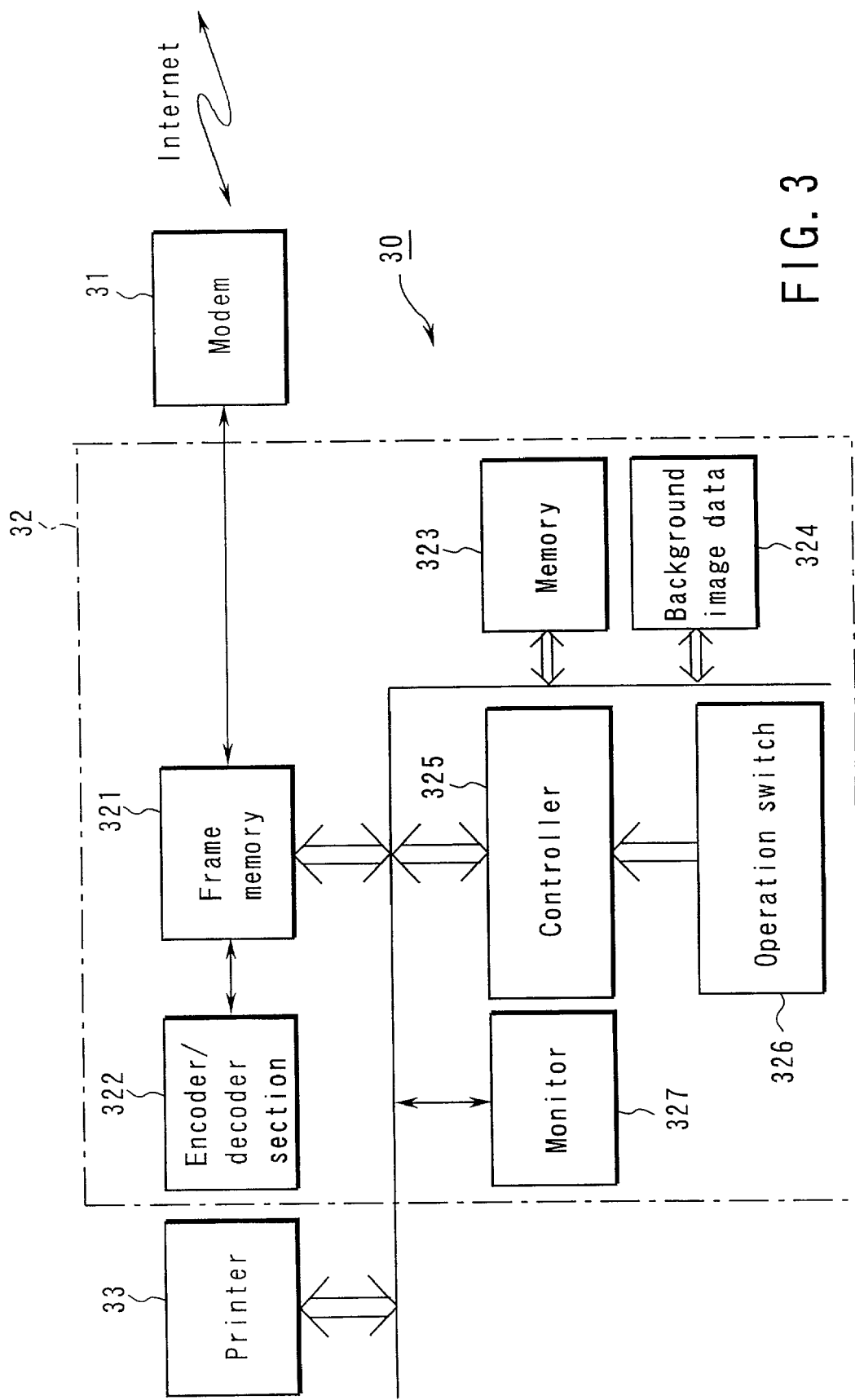
FIG. 3 is a figure showing a more detailed configuration of a server 32 in a center 30.

FIG. 3 is a figure showing a more detailed configuration of the server 32 in the center 30. The server 32 includes a frame memory 321 for exchanging image data with the modem 31, an encoding/decoding unit 322 for encoding and decoding the image data, a memory 323 for storing a plurality of image data, a background image memory 324 for storing background images, a controller 325 for controlling each component, operation switches 326, a monitor 327, and the like.

Next, an operation of the present embodiment will be described.

Figure 4A:
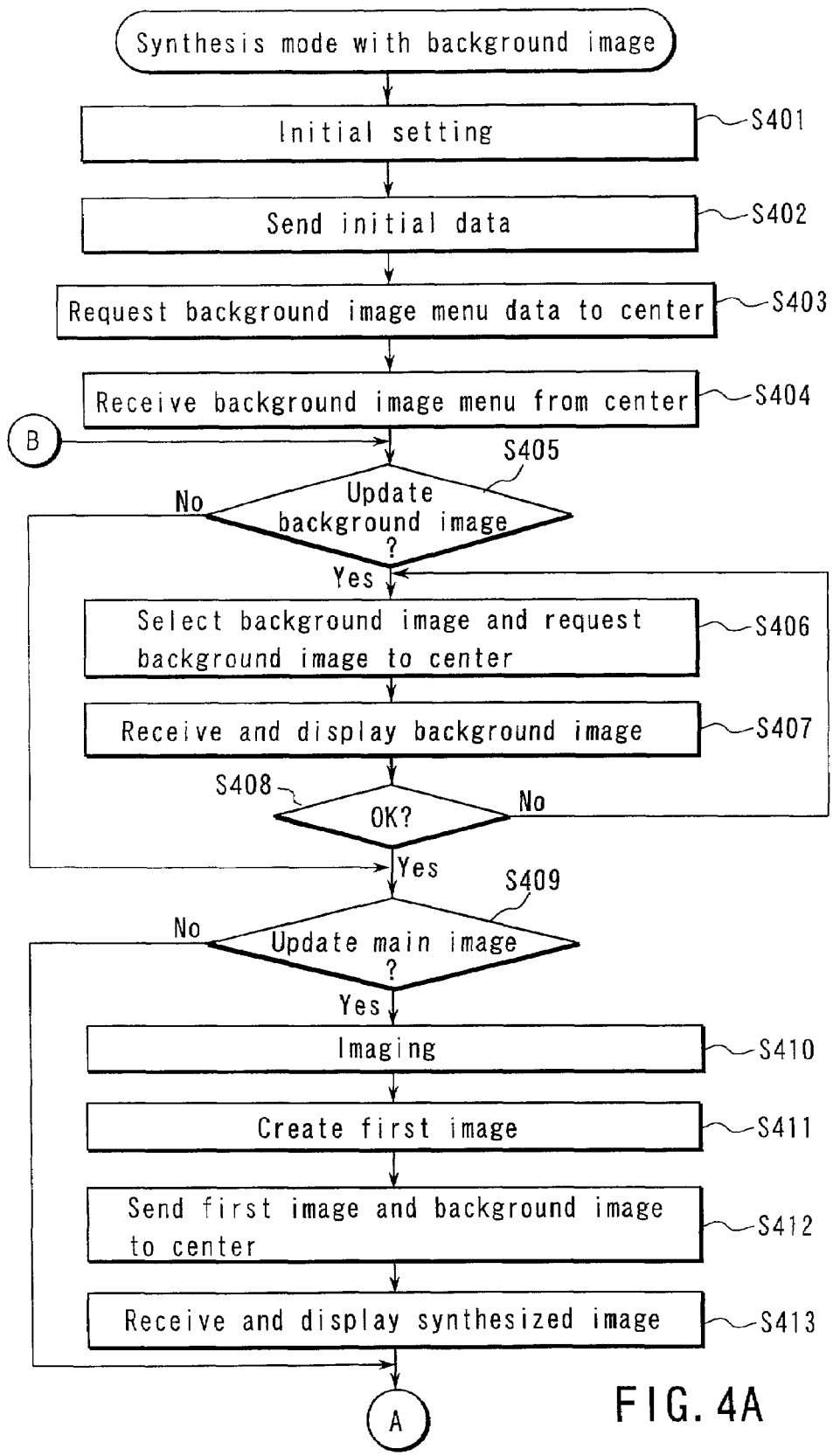
FIGS. 4A and FIG. 4B are flowcharts to explain an operation performed in the camera when synthesizing an image with a background image.
Figure 4B:
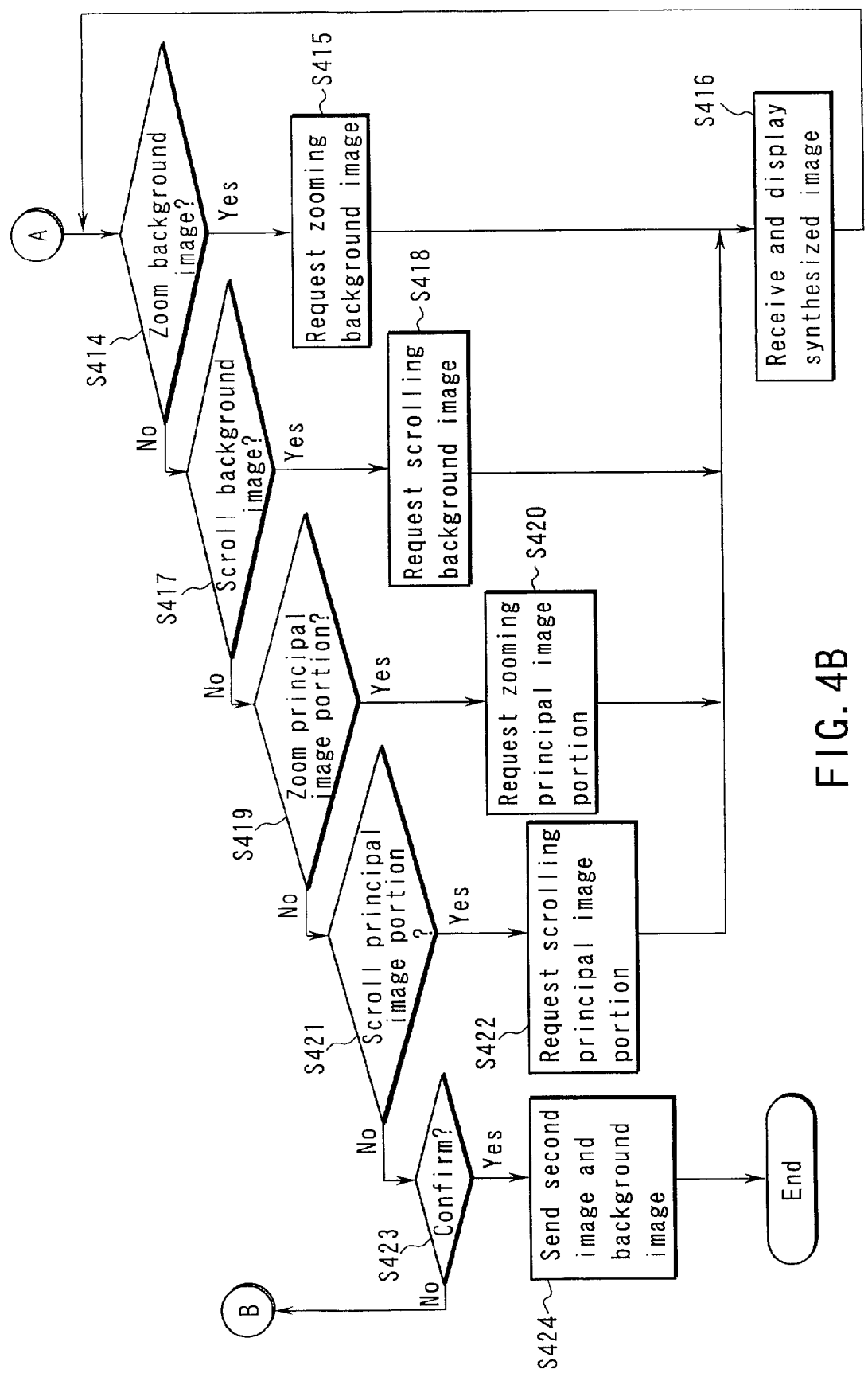

FIGS. 4A and FIG. 4B show a flowchart to explain an operation performed in the camera when synthesizing an image with a background image.

When the operation switch 13 is operated to select a mode of "synthesizing with background image", first, initial settings of various flags in the computer are made in S401. Next, in S402, the camera 20 transmits to the center 30 an initial data including "the camera's own address" and a "code indicating the synthesis mode with background image."

Next, in S403, a request is made of the center 30 for a menu of background images. The background image menu has a hierarchical structure. For example, at the top of the hierarchy there are "sceneries", "buildings" and the like, below which there are "mountains", "seas and oceans" and the like. Further, below the "seas and oceans" level, there are "Hawaii", "West Coast" and the like, and these titles are displayed in characters on the LCD 7. When the menu is received in S404, the next step S405 determines whether or not the background image is to be updated. If the background image is to be updated, for example, the user uses a mouse to click a predetermined dialogue (not shown) displayed on the LCD 7, thereby sending a command for updating the background image. Right after the synthesis mode with the background image is selected, there is no background image selected. In order to handle this case, "update of the background image" is selected in the initial setting made in S401.

If the "update of the background image" is selected in S405, S406 is executed to select a background image from the background image menu and to request the center 30 for transmission of the selected background image. Next, in S407, the background image sent from the center 30 is received and the received background image is displayed on the LCD 7. If this background image is not a desired one, the user requests the center 30 again for transmission of another background image in S408. This cycle is repeated until a desired image is received.

When the desired background image is received in S408, or update of the background image is not selected in S405, S409 determines whether or not a main image is to be updated. If the selection is made for updating the main image, for example, the user uses a mouse to click a predetermined dialogue (not shown) displayed on the LCD 7, thereby sending a command for updating the main image. Right after the synthesis mode with the background image is selected, there is no main image selected. In order to handle this case, "update of the main image" is selected in the initial setting made in S401.

It should be appreciated that in order to synthesize a main image with a background image, a certain portion of the main image which eventually is to be placed on the background image (hereinafter this portion is called "principal image portion") must be trimmed out of the main image. In order to facilitate recognition of the principal image portion, a human figure is treated as a chief object in the main image. In order to facilitate recognition of the main image, outline information for identifying the principal image portion, e.g. outline information of a "person", a "building" and the like, may be transmitted as header information of the main image to the center 30, so that the center 30 can use pattern recognition based on the header information for trimming the principal image portion out of the main image.

Now, assume that "update of the main image" is selected in S409. Then, in S410, imaging is performed, and then in S411, a first image is created. The first image is a reduced image of the main image for finally creating the synthesized image. The reduced image may be read from the imaging element by thinning operation or may be generated by a computing operation such as a thinning operation after being read from the imaging element.

Next, in S412, the first image and the background image are transmitted to the center 30. The reason for sending the reduced image which is the first image is to increase the transmission speed and reduce the transmission cost. Further, since the background image is stored in the center 30, the background image sent from the camera 20 to the center 30 may not necessarily be the background image itself, but anything that represents the background image.

When the first image and the background image are transmitted to the center 30, the center 30 trims the principal image portion from the main image, and synthesizes the trimmed principal image portion with the background image. If the image sent from the camera 20 is recognized as the first image, i.e. the reduced image, the center 30 transmits the synthesized image to the camera 20. Then, the camera 20 receives the synthesized image in S413, and displays the received image on the LCD 7.

Figure 5A:
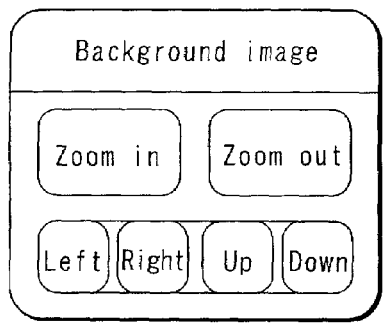
FIGS. 5A and 5B are figures showing a display state of an LCD when performing zooming and/or scrolling operations of the background image and the main image.

When display of the synthesized image is ended or the main image is not updated in S409, in S414, whether or not the background image is zoomed is determined. If zooming of the background image is selected, in S415, it is request for the zooming of the background image. Specifically, as shown in FIG. 5A, the LCD 7 displays a "zoom in" button and a "zoom out" button of the background image, and by clicking one of these buttons, zooming of the background image is selected. Assume now, that selection is made in S414 for zooming of the background image. Then, a signal corresponding to "zoom in" or "zoom out" is transmitted to the center 30. The center 30 performs a zooming operation to the specified ratio of magnification or reduction, and then synthesizes the magnified or reduced background with the main image. The resulting synthesized image is received in S416, and then displayed on the LCD 7. This cycle of operation is repeated as far as the "zoom in" button or "zoom out" button is selected.

If the zooming of the background image is not selected in S414, then in S417 whether or not scrolling of the background is selected is determined. If the background image is to be scrolled, a scrolling request is sent in S418. Specifically, as shown in FIG. 5A, the LCD 7 displays a "left" button, a "right" button, an "up" button and a "down" button, and by clicking one of these buttons, a scrolling direction of the background image is selected from up, down, left and right. If a selection is made in S417 for scrolling of the background image, a signal corresponding to one of the up, down, left and right directions is transmitted to the center 30. The center 30 performs a scrolling operation of the background image in the specified direction, and then synthesizes the scrolled background with the main image. The resulting synthesized image is received in S416, and then displayed on the LCD 7. This cycle of operation is repeated as far as the "left" button, the "right" button, the "up" button or the "down" button is selected.

Figure 5B:
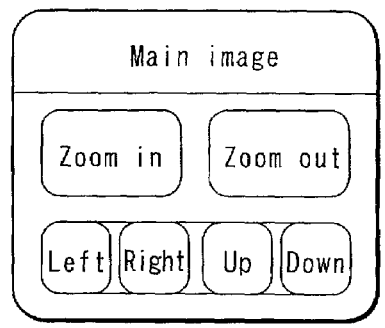

If scrolling of the background image is not selected in S417, in S419, whether or not zooming of the principal image portion is selected is determined. If zooming of the principal image portion is selected, in S420, it is requested for the zooming of the principal image portion. Specifically, as shown in FIG. 5B, the LCD 7 displays a "zoom in" button and a "zoom out" button of the principal image portion, and by clicking one of these buttons, zooming of the principal image portion is selected. If selection is made in S419 for zooming of the principal image portion, a signal corresponding to the selected "zoom in" or "zoom out" is then transmitted to the center 30. The center performs a zooming operation to the specified ratio of magnification or reduction, and then synthesizes the magnified or reduced principal image portion with the background image. The resulting synthesized image is received in S416, and then displayed on the LCD 7. This cycle of operation is repeated as far as the "zoom in" button or "zoom out" button is selected.

If zooming of the principal image portion is not selected in S419, in S421, whether or not scrolling of the principal image portion is selected is determined. If the principal image portion is to be scrolled, a scrolling request is sent in S422. Specifically, as shown in FIG. 5B, the LCD 7 displays a "left" button, a "right" button, an "up" button and a "down" button, and by clicking one of these buttons, a scrolling direction of the principal image portion is selected from up, down, left and right scrolling directions. If a selection is made in S421 for scrolling of the principal image portion, a signal corresponding to one of the up, down, left and right directions is then transmitted to the center 30. The center 30 performs a scrolling operation of the principal image portion in the specified direction, and then synthesizes the scrolled principal image portion with the background image. The resulting synthesized image is received in S416, and then displayed on the LCD 7. This cycle of operation is repeated as far as the "left" button, the "right" button, the "up" button or the "down" button is selected.

If scrolling of the principal image portion is not selected in S421, in S423, whether or not the synthesized image displayed currently on the LCD 7 is the final is determined. If it is not the final, then the process returns to S405 to repeat the above cycle of operation. If the image is confirmed as the final, in S424, a second image and the confirmed background image are transmitted to the center 30. The second image is the original image of the reduced image, i.e. the first image. If the first image is an image derived by reading a signal from the imaging element by a thinning operation, the second image is a non-reduced image imaged again and read from the imaging element. If the first image is created by the image read from the imaging element, the second image is the image before the reducing operation.

Figure 6:
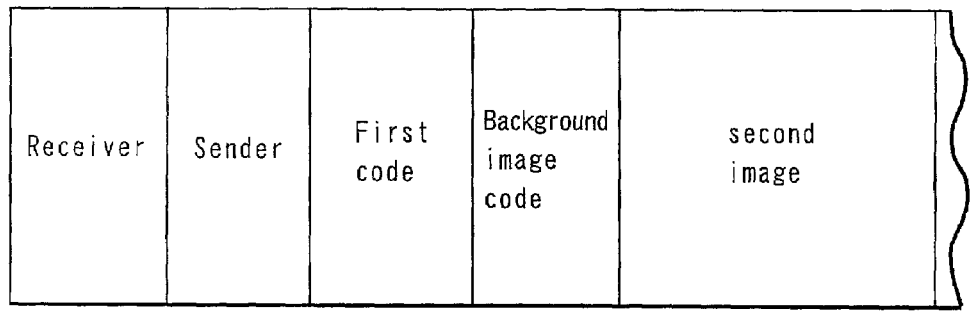
FIG. 6 is a figure showing a format of data transmitted from the camera to the center.

FIG. 6 is a figure showing a data format transmitted in step S424 from the camera 20 to the center 30. RECEIVER represents an address of the center 30, whereas SENDER represents an address of the camera 20. A first code is a data instructing if the synthesized image made from the second image and the background image is printed at the center 30 or is transmitted to a specified address. For example, a value "0" is recorded when the printing is selected, and when the image is transmitted to a predetermined address, the corresponding address is recorded. A background image code is a data indicating the finally confirmed background image. The background image is an image sent from the center 30. Therefore, a certain code for identifying the transmitted image may be included in the header when the background image is sent, so that only the header information may be returned as the background image to the center 30. With this arrangement, the center 30 may simply search a background image corresponding to the returned data, thereby easily identify the background image.

Figure 7:
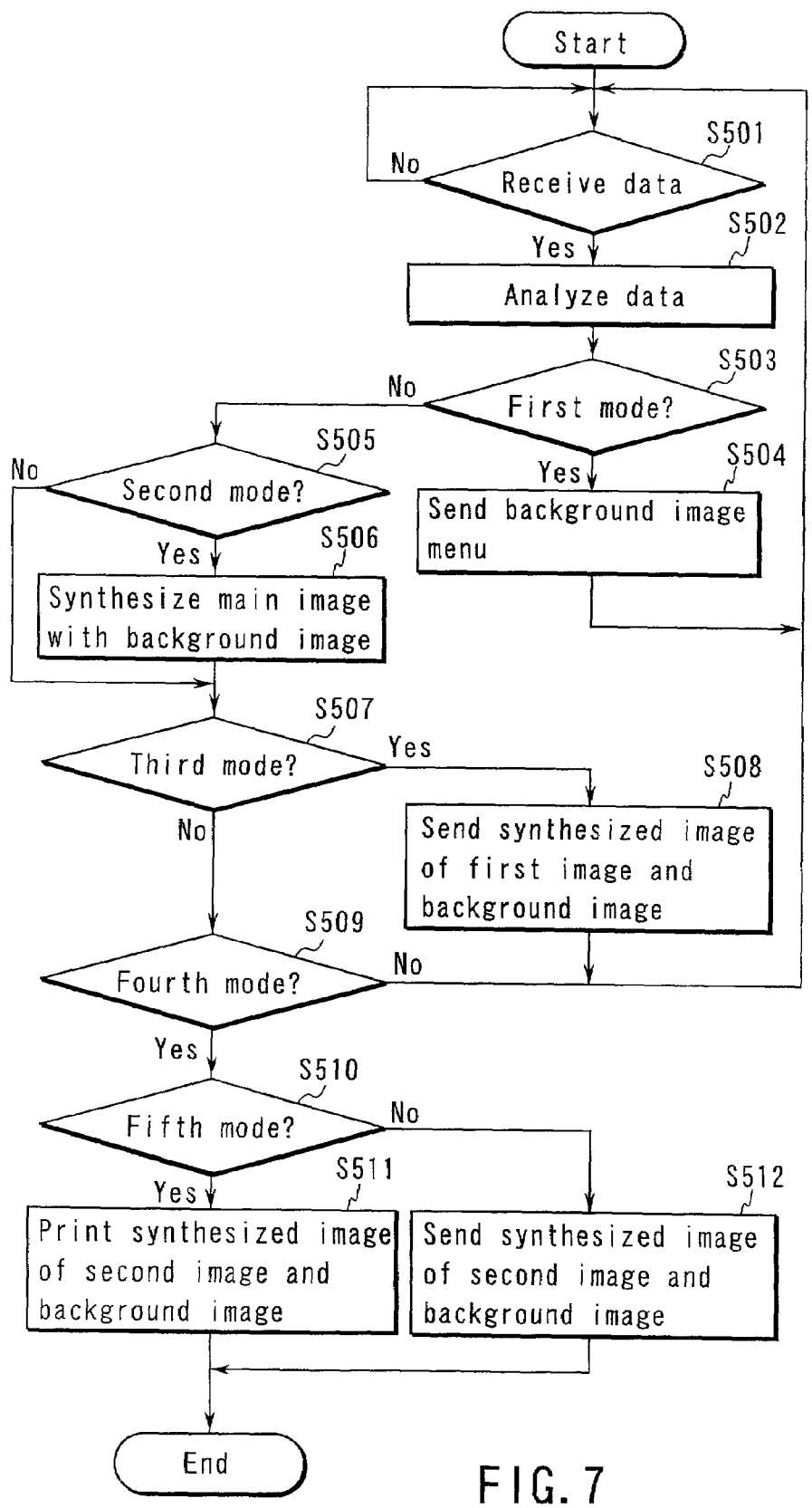
FIG. 7 is a flowchart to explain an operation performed in the center when synthesizing an image with a background image.

FIG. 7 is a flowchart to explain an operation performed in the center when synthesizing an image with a background image.

In S501, whether or not there is a reception of data from the camera 20 is determined. If the data is received, the received data is analyzed in S502. If it is judged that the mode of processing is a first mode, i.e., a mode that the menu data of the background images is transmitted to the camera 20, in S503, the menu data of the background images is transmitted to the camera 20 in S504. This operation is based on the request in S403 explained in the operation flow of the camera 20 described above. If a mode is not the first mode in S503, whether or not the mode is a second mode, i.e., a mode of synthesizing the main image with the background image, is determined in S505.

If a mode is the second mode, the main image is synthesized with the background image in S506. A note should be made here about the synthesizing process. Specifically, if the image transmitted from the camera 20 is a reduced image (See S412, S415, S418, S420, and S422 in FIG. 4A and FIG. 4B), the reduced image, i.e. the first image, sent from the camera 20 is accompanied by a data that identifies the selected background image. Based on these data, first, a principal image portion (a human figure if the object of the image is a person) is trimmed out of the main image, and then the specified background image stored at the center 30 is synthesized with the first image. On the other hand, if the image sent from the camera 20 is an original image which is not reduced (See S424 in FIG. 4B), then the original image, i.e. the second image sent from the camera 20 is accompanied by a data that identifies the selected background image. Based on these data, first, a principal image portion (a human figure if the object of the image is a person) is trimmed out of the main image, and then the specified background image stored at the center 30 is synthesized with the second image.

The synthesized image thus prepared then undergoes a different procedure depending on the processing mode. Specifically, if a mode is a third mode, i.e. when the image is made by synthesizing the first image and the background image in S507, the synthesized image to the camera 20 is transmitted in S508 and the process returns to S501, to repeat the similar operations. On the other hand, if the image is not made by synthesizing the first image and the background image, whether or not the current mode is a fourth mode, i.e. whether or not the image is made by synthesizing the second image and the background image is determined in S509. If this combination is not yet made, the process returns to S501 and repeats the similar operations.

If the image is made by synthesizing the second image and the background image in S509, the process follows a different procedure depending on the mode. Specifically, in a fifth mode, i.e., in a mode of printing the synthesized image made from the second image and the background image, the synthesized image made from the second image and the background image is printed. The printed image is later mailed to the customer, or the customer makes a visit to pick up the print. On the other hand, if the mode is not the fifth mode, i.e., a mode of transmitting the synthesized image of the second image and the background image in S510, the synthesized image of the second image and the background image is transmitted with on-line to an address specified by the camera 20. The instruction data to judge whether or not the mode is the fifth mode is included in the data transmitted from the camera in S424 of FIG. 4B.

Figure 8A:
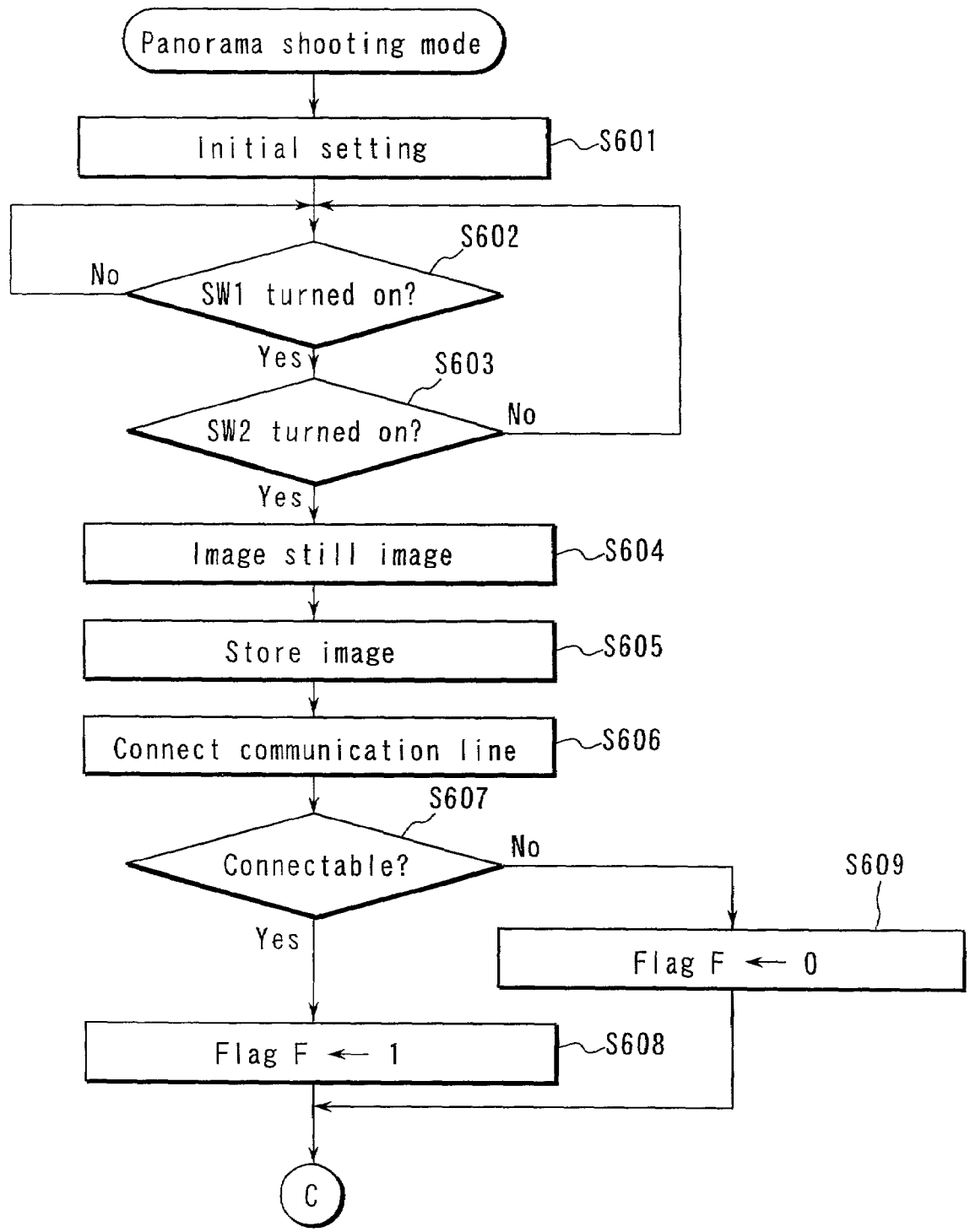
FIGS. 8A and FIG. 8B are flowcharts to explain an operation performed in the camera when taking a panorama view.
Figure 8B:
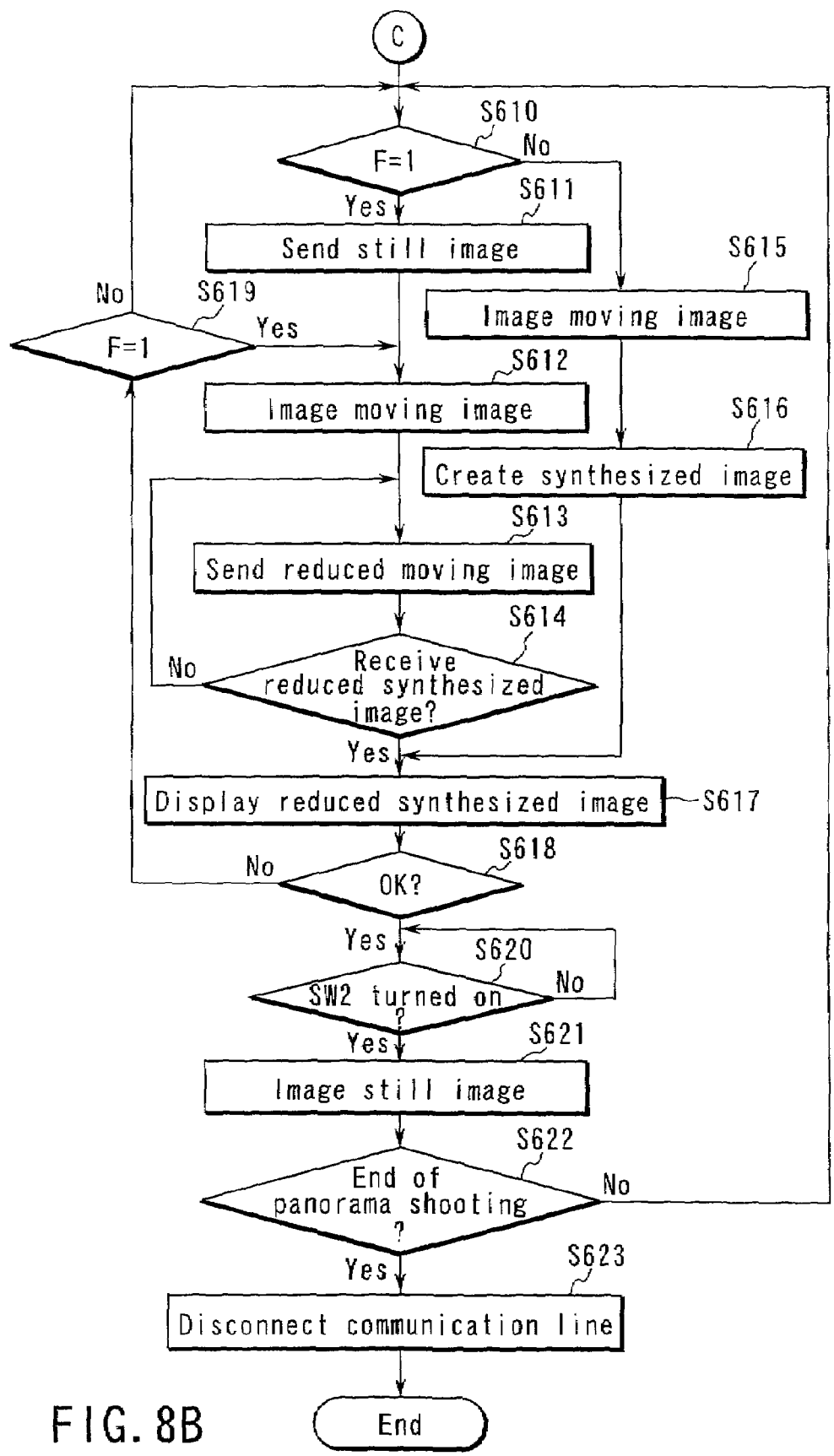

FIGS. 8A and FIG. 8B show a flowchart to explain an operation performed by the camera when taking a panorama view.

When the panorama-shot mode is selected, first, in S601, various initial settings of flags etc. are performed. Next, in S602, whether or not the release first switch (SW1) is turned on is determined. If the first switch is turned on, whether or not the release second switch (SW2) is turned on is determined in S603. If the release second switch is not turned on in S603, the process returns to S602 and repeat the similar operations. If the release second switch is turned on in S603, in S604, a still-image shooting is performed, and in S605, the imaged image is stored in the frame memory 5. The reason why it is called as a still image is as follows. In the panorama-shooting process, correlation calculation is performed between the still image that is taken first and a moving image that is taken consecutively to display the relative relationship between the still image and the moving image.

Next, in S606, a communication line with the center 30 is established. In S607, if the communication line is available, a value "1" is set to a flag F in S608, and this information is stored in the memory 15. If the communication line cannot be established in S607, then a value "0" is set to the flag F in S609. In S610, the value of the flag F is determined, and if the flag F has the value "1", then the process recognizes that the current mode is a mode of performing panorama shooting co-operative with the center 30, and the still image is transmitted to the center 30 in S611. Next, in S612 the moving image is taken, and a reduced image of the moving image is created and transmitted to the center 30 in S613.

The center 30 creates a reduced image of the still picture, and creates the synthesized image so that the reduced image and the above-described first image are continuously connected. The reduced synthesized image thus produced is transmitted to the camera 20. In S614, whether or not the reduced synthesized image is received is determined. If the reduced synthesized image is received, the reduced synthesized image is displayed in S617.

On the other hand, if the flag F does not have "1" in S610, i.e., if the communication line is not available with the center 30, the moving image is taken in S615, and the synthesized image is created in S616. In this case, however, since calculation speed of the camera 20 is slower than that of the center 30, it will take a longer time to create the reduced image. The reduced image thus prepared is then displayed on the LCD 7 in S617.

Figure 9A:
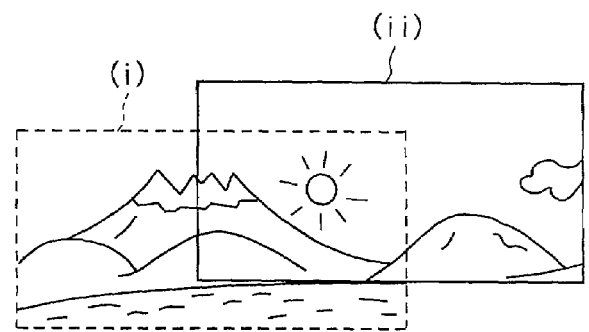
FIGS. 9A and 9B are figures showing an example of reduced image displayed on the LCD.

The display of the reduced image on the LCD 7 is as shown in FIG. 9A, for example. In FIG. 9A, an image enclosed by dotted line is the still image, and an image enclosed by solid line is the moving image. In FIG. 9A, the moving image is inclined to an upper right direction, and the user can adjust his framing of the camera by confirming the image. In the flowchart in FIG. 8B, in S618, if the user, looking into the LCD, judges that the framing is not yet completed (the state in FIG. 9A, for example), in S619, the user confirms the value of the flag F and updates the moving image data if the flag F has the value "1", and the operations from S612 through S617 are repeated. If the flag F does not have the value "1" in S619, then the process branches to S610, and the reduced image is synthesized by the camera 20 similar to the case as described above (S616).

If the framing is completed in S618 (the state in FIG. 9B, for example), then whether or not the release second switch is turned on is determined in S620. If the release second switch is turned on, then a still-image shooting is performed in S621. Next, in S622, if the panorama shooting is not finished, the process branches to S610, and the operations from S611 through S621 are repeated. If the panorama shooting is finished in S622, the process is terminated by cutting off the communication line in S623.

Figure 10:
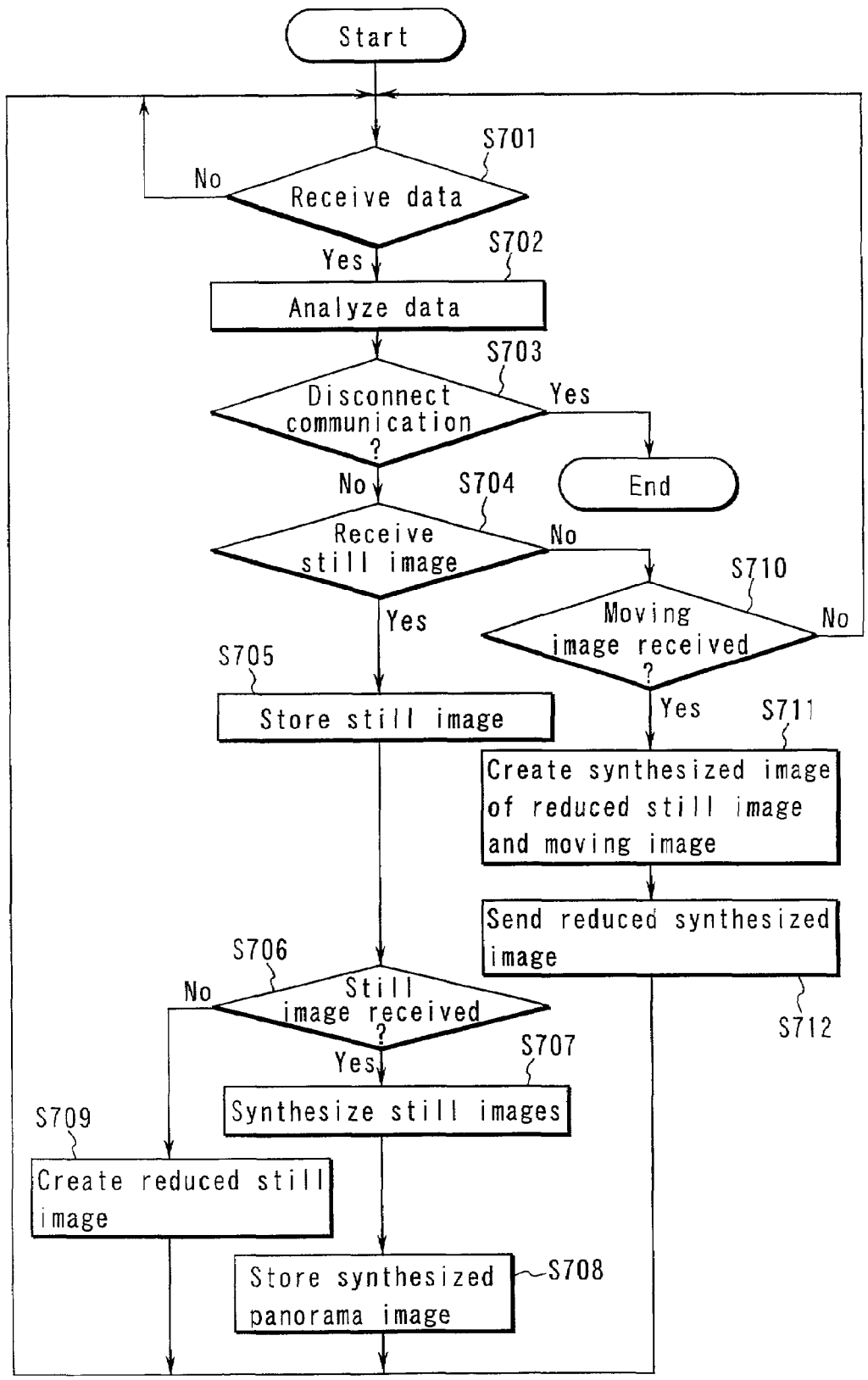
FIG. 10 is a flowchart to explain an operation performed in the center when taking a panorama view.

FIG. 10 is a flowchart to explain an operation performed in the center when taking the panorama image.

In S701, whether or not there is data reception from the camera 20 is determined. If the data is received, the received data is analyzed in S702. Next, in S703, whether or not the communication line is cut off is determined. If the communication line is cut off, the operation is terminated on an assumption that the panorama shooting is finished.

If the communication line is not cut off in S703, whether or not a still image is received is determined in S704. If the still image is received, the still image is stored in the memory in S705. Whether the received image is a still image or a moving image may be judged by the header information of the received image. Alternatively, the judgment may be made based on the size of the image since the still image has a larger data size than the moving image (the moving image has a larger data size than the reduced image).

If no still image has yet been received in S706, before receiving the still image in S704, then, there is no image to synthesize the still image received in S705 and a panorama image. Therefore, after creating the reduced image of the still in S709, the process branches to S701 and the operations from S701 through S705 are repeated. The reason why a reduced still image is created in S709 is that the moving image received consecutively and the above-mentioned reduced still image are synthesized and are transmitted to the camera as described later.

Figure 9B:
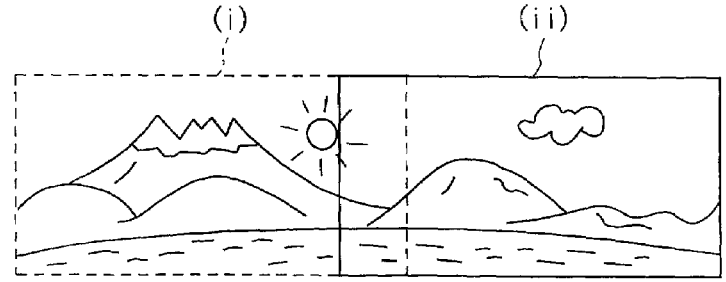

If a still image is already received in S706, the still image stored in the step S705 and the still image previously stored are synthesized in S707 to create a panorama image. In S708, the synthesized panorama image is stored in the memory. This combing process is an operation for connecting the two images into a continuous image as shown in FIG. 9B, by using a known method. Every time the camera 20 transmits a still image, an already synthesized still image is further synthesized with a newly transmitted image, whereby a desired panorama image can be created.

If a still image cannot be received in S704, then, S710 determines whether or not a moving image is received. If the moving image is not received, then the process returns to S701. If the moving image is received in S710, the reduced still image is synthesized with the reduced moving image in S711, and the reduced synthesized image is transmitted to the camera 20 in S712. The camera 20 displays this reduced synthesized image on the LCD 7. This enables to perform accurate panorama shooting by confirming the framing of the camera 20. After the transmission of the reduced synthesized image in S712, the process returns to S701, and the above-described operations are repeated.

According to the present invention, an image processing is performed in the center 30 connected to the electronic camera 20, and there is no need for the camera to perform a complex image processing. Therefore, a load on the camera 20 can be greatly reduced. Further, since it becomes possible to perform the image processing in the center having a huge memory capacity and high calculation ability, it becomes possible to enjoy an advanced image processing such as a scroll of the background image even in a typical camera having a communication function. In addition, a load of the communication can be greatly reduced, since the first image is transmitted to the center 30, the synthesized image prepared in the center 30 is displayed on the LCD 7 for confirmation, and the second image which has a larger number of pixels is transmitted to the center 30.

From the above embodiment, there can be derived the following invention.

An electronic camera according to the present invention is characterized by comprising: imaging means for imaging an image of an object; first image creating means for creating a first image based on the image imaged by said imaging means; operating means for setting information indicating a predetermined process; first transmission means for transmitting the first image and the information indicating the predetermined process to a center via a communication line; reception means for receiving an image transmitted from the center according to a processing result of the first image; display means for displaying the image received by the reception means; and second transmission means for transmitting to the center a second image having a larger number of pixels than an image corresponding to the first image.

Preferred manners of embodiment of the present invention are as follows.

(1) A processing set by said operating means is a synthesizing processing of an imaged image with a desired background image.

(2) A processing set by said operating means is a synthesizing processing of a panorama image.

(3) The first image is a reduced image of an image imaged by the imaging means, and the second image is the image before the reduction.

(4) If the first image is an image in which thinned signals are read out from the imaging elements of the imaging means, an imaging is performed again and the second image which is not reduced is read out.

(5) If the first image is created by reducing an image which is read out from the imaging elements of the imaging means, the second image is the image before the reduction.

(6) Background selection means for selecting a background image is further provided, in which said first transmission means transmits the first image created by said first image creating means and a data relating to a background image selected by said background image selection means to the center via the communication line, said reception means receives a synthesized image by synthesizing the first image with the background image transmitted from the center, via the communication line, and said second transmission means transmits to the center via the communication line the second image having a larger number of pixels than an image corresponding to the first image and the data relating to the background image selected by said background image selection means.

(7) In (6), the background image selection means selects an arbitrary background image among background images received by said reception means and stored in the center.

(8) In (6), the background image selected by said background image selection means is scrollable in at least one of a horizontal direction and a vertical direction.

(9) In (6), the first image is a reduced image of the image imaged by the imaging means, and the second image is an image before the reduction.

(10) In (6), if the first image is an image in which thinned signals are read out from the imaging elements of the imaging means, an imaging is performed again and the second image which is not reduced is read out.

(11) In (6), if the first image is made by reducing an image which is read out from the imaging elements of the imaging means, the second image is the image before the reduction.

Another electronic camera according to the present invention is characterized by comprising: imaging means for imaging an image of an object; transmission means for transmitting to a center via a communication line a first image obtained by the imaging means; and reception means for receiving via the communication line a predetermined data processed by the center based on the first image transmitted to the center, in which an imaging operation is performed by said imaging means based on the data received by said reception means, and the second image obtained through the imaging is transmitted to the center via the communication line.

Preferred manners of embodiment of this electronic camera are as follows.

(1) Storage means for storing the images obtained by said imaging means is further provided, in which an imaging is performed by said imaging means based on a data received by said reception means, and at least one of transmission of the second image obtained by the imaging to the center via the communication line and storage thereof in said storage means is performed.

(2) A size of the first image is smaller than that of the second image.

(3) The data is a synthesized image of a principal portion of the first image and a background image stored in advance at the center.

(4) The data is a synthesized image of an image obtained by previously imaging and an image transmitted to the center.

An imaging system according to the present invention is characterized by comprising an electronic camera for imaging an object and a center for processing an image, said electronic camera and said center being connected with each other via a communication line, in which said center includes: center-side reception means for receiving an image and an information indicating a predetermined process to be performed to the image; processing means for performing a predetermined process to the received image based on the information received by the center-side reception means; and center-side transmission means for transmitting a result of the processing performed by said processing means, and said electronic camera includes: imaging means for imaging an object; first image creating means for creating a first image based on an image imaged by said imaging means, operating means for setting information indicating a predetermined process, first camera-side transmission means for transmitting the first image and the information indicating the predetermined process to the center; camera-side reception means for receiving a result of the processing transmitted from the center; display means for displaying the processing result received by the camera-side reception means; and second camera-side transmission means for transmitting to the center a second image corresponding to the first image and having a larger number of pixels than the first image.

Another imaging system according to the present invention is characterized by comprising an electronic camera for imaging an object and a center for processing an image, said electronic camera and said center being connected via a communication line, in which said center includes: center-side reception means for receiving an image and a background image with respect to the image; processing means for synthesizing the image and the background image received by the center-side reception means; and center-side transmission means for transmitting a result of the processing performed by said processing means, and said electronic camera includes: imaging means for imaging an object; background selection means for selecting a background image; first image creating means for generating a first image based on the image imaged by the imaging means; first camera-side transmission means for transmitting to the center the first image created by said first image creating means and a data relating to a background image selected by said background image selection means; camera-side reception means for receiving a result of the process transmitted from the center; display means for displaying a synthesized image received by said camera-side reception means; and second camera-side transmission means for transmitting to the center a second image corresponding to the first image and having a larger number of pixels than the first image together with the data relating to the selected background image.

Still another imaging system according to the present invention is characterized by comprising an electronic camera for imaging an object and a center for processing an image, said electronic camera and said center being connected via a communication line, in which said center includes: center-side reception means for receiving an image; data generating means for generating a predetermined data based on the image received by said center-side reception means; and center-side transmission means for transmitting the data generated by said generating means, and said electronic camera includes: imaging means for imaging an object; storage means for storing the image obtained by said imaging means; first camera-side transmission means for transmitting a first image imaged by said imaging means to the center; and camera-side reception means for receiving the data transmitted from the center, in which an imaging is performed based on the data received by said camera-side reception means, and a second image obtained through this imaging is stored in said storage means.

Still another imaging system according to the present invention is characterized by comprising an electronic camera for imaging an object and a center for processing an image, said electronic camera and said center being connected via a communication line, in which said center includes: center-side reception means for receiving an image; data creating means for creating a predetermined data based on the image received by said center-side reception means; and center-side transmission means for transmitting the data generated by data creating means, and said electronic camera includes: imaging means for imaging an object; camera-side transmission means for transmitting a first image imaged by said imaging means to the center; and camera-side reception means for receiving the data transmitted by the center, in which an imaging is performed based on the data received by said camera-side reception means, and a second image obtained through the imaging is transmitted to the center.

An imaging method according to the present invention is an imaging method using an electronic camera connected, via a communication line, with a center performing an image processing, and is characterized by comprising: imaging an object; creating a first image based on the imaged image; setting information indicating a predetermined image processing; transmitting the first image and an information indicating a content of the predetermined image processing to a center via a communication line; receiving a result of a processing transmitted from the center via the communication line, after a predetermined processing is preformed to the first image based on the information indicating the image processing in said center; displaying the processing result received; and transmitting to the center via the communication line a second image having a larger number of pixels than the image corresponding to the first image.

Another imaging method according to the present invention is an imaging method using an electronic camera connected, via a communication line, with a center performing an image processing, and is characterized by comprising: imaging an object; selecting a background image; generating a first image based on the imaged image; transmitting the first image and a data about the selected background image to a center via a communication line; receiving a synthesized image transmitted from the center via the communication line, after synthesizing the first image with the selected background image in the center; displaying the synthesized image received; and transmitting to the center via the communication line a second image corresponding to the first image and having a larger number of pixels than the first image together with the data relating to the selected background image.

An imaging method according to the present invention is characterized by comprising: imaging an object; storing the image obtained by an imaging; transmitting a first image obtained by the imaging to a center via a communication line; receiving a predetermined data processed in the center via the communication line based on the first image transmitted to the center; performing an imaging based on the received data; and storing a second image obtained by the imaging based on the received data.

An imaging method according to the present invention is characterized by comprising: imaging an object; receiving a predetermined data processed in the center via the communication line based on the first image transmitted to the center; performing an imaging based on the received data; and transmitting a second image obtained by the imaging based on the received data.

According to the present invention, there is no need for the electronic camera to perform advanced image processing because the imaging by the camera can be performed on the basis of data obtained from image processing such as synthesizing operations performed by the center. Therefore, load on the camera can be reduced. Further, since it is possible to perform the image processing at the center having a huge memory capacity and high calculation ability, it becomes possible to enjoy the image processing which is difficult to realize by an individual camera, with an ordinary electronic camera.

Further, the load on the communications can be reduced, since the first image with a smaller number of pixels is transmitted from the camera to the center, and the synthesized image (with a small number of pixels) synthesized by the center is received and confirmed, and thereafter, the second image with a larger number of pixels is transmitted to the center. In other words, by distinguishing an image for final storage at the center (i.e. an image with a large number of pixels and a large data size) from an image confirmed on the electronic camera, it has become possible to reduce the amount of data to be transmitted and received via a communication line, whereby enabling to reduce the load on the communications.

Further, the background image is not stored in the camera but in the center. This makes possible, without increasing the load on the camera, to make a synthesized image of the image taken by the camera with the background image. In this arrangement, since a huge amount of background images can be stored at the center, a large variety of synthesized images can be available. Further, since huge background images can be stored at the center, a scrolling function can be made available for the background image, making possible to choose a more satisfying background image.

According to the above-mentioned embodiment of the present invention, it becomes possible to easily realize a level of performance and/or functions which have been difficult with an ordinary electronic camera, by connecting thereby operatively associating the electronic camera with a center via a communication line, and distinguishing an image for final storage at the center (i.e. an image with a large number of pixels and a large data size) from an image confirmed on the electronic camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   imaging means for imaging an image of an object;
   first image creating means for creating a first image based on the image imaged by said imaging means;
   operating means for setting information indicating a predetermined process;

first transmission means for transmitting the first image and the information indicating the predetermined process to a center via a communication line;

reception means for receiving an image transmitted from the center according to a processing result of the first image;

display means for displaying the image received by the reception means; and second transmission means for transmitting to the center a second image having a larger number of pixels than an image corresponding to the first image.

2. The electronic camera according to claim 1, wherein a processing set by said operating means is a synthesizing processing of an imaged image with a desired background image.

3. The electronic camera according to claim 1, wherein a processing set by said operating means is a synthesizing processing of a panorama image.

4. The electronic camera according to claim 1, further comprising background selection means for selecting a background image, wherein said first transmission means transmits the first image created by said first image creating means and a data relating to a background image selected by said background image selection means to the center via the communication line, said reception means receives a synthesized image by synthesizing the first image with the background image transmitted from the center, via the communication line, and said second transmission means transmits to the center via the communication line the second image having a larger number of pixels than an image corresponding to the first image and the data relating to the background image selected by said background image selection means.

5. The electronic camera according to claim 4, wherein said background image selection means selects an arbitrary background image among background images received by said reception means and stored in the center.

6. The electronic camera according to claim 4, wherein the background image selected by said background image selection means is scrollable in at least one of a horizontal direction and a vertical direction.

7. The electronic camera according to claim 1, wherein the first image is a reduced image of the image imaged by the imaging means, and the second image is an image before the reduction.

8. An electronic camera comprising:

imaging means for imaging an image of an object;

transmission means for transmitting to a center via a communication line a first image obtained by the imaging means; and reception means for receiving via the communication line a predetermined data processed by the center based on the first image transmitted to the center, wherein an imaging operation is performed by said imaging means based on the data received by said reception means, wherein a second image obtained through the imaging is transmitted to the center via the communication line, and wherein a size of the first image is smaller than that of the second image.

9. An imaging system comprising an electronic camera for imaging an object and a center for processing an image, said electronic camera and said center being connected with each other via a communication line, wherein said center includes: center-side reception means for receiving an image and an information indicating a predetermined process to be performed to the image; processing means for performing a predetermined process to the received image based on the information received by the center-side reception means; and center-side transmission means for transmitting a result of the processing performed by said processing means, and said electronic camera includes: imaging means for imaging an object; first image creating means for creating a first image based on an image imaged by said imaging means, operating means for setting information indicating a predetermined process, first camera-side transmission means for transmitting the first image and the information indicating the predetermined process to the center; camera-side reception means for receiving a result of the processing transmitted from the center; display means for displaying the processing result received by the camera-side reception means; and second camera-side transmission means for transmitting to the center a second image corresponding to the first image and having a larger number of pixels than the first image.

10. An imaging system comprising an electronic camera for imaging an object and a center for processing an image, said electronic camera and said center being connected via a communication line, wherein said center includes: center-side reception means for receiving an image and a background image with respect to the image; processing means for synthesizing the image and the background image received by the center-side reception means; and center-side transmission means for transmitting a result of the processing performed by said processing means, and said electronic camera includes: imaging means for imaging an object; background selection means for selecting a background image; first image creating means for generating a first image based on the image imaged by the imaging means; first camera-side transmission means for transmitting to the center the first image created by said first image creating means and a data relating to a background image selected by said background image selection means; camera-side reception means for receiving a result of the process transmitted from the center; display means for displaying a synthesized image received by said camera-side reception means; and second camera-side transmission means for transmitting to the center a second image corresponding to the first image and having a larger number of pixels than the first image together with the data relating to the selected background image.

11. An imaging method comprising:

imaging an object;

creating a first image based on the imaged image;

setting information indicating a predetermined image processing;

transmitting the first image and an information indicating a content of the predetermined image processing to a center via a communication line;

receiving a result of a processing transmitted from the center via the communication line, after a predetermined processing is preformed to the first image based on the information indicating the image processing in said center;

displaying the processing result received; and transmitting to the center via the communication line a second image having a larger number of pixels than the image corresponding to the first image.

12. An imaging method comprising:

imaging an object;

selecting a background image;

generating a first image based on the imaged image;

transmitting the first image and a data about the selected background image to a center via a communication line;

receiving a synthesized image transmitted from the center via the communication line, after synthesizing the first image with the selected background image in the center;

displaying the synthesized image received; and transmitting to the center via the communication line a second image corresponding to the first image and having a larger number of pixels than the first image together with the data relating to the selected background image.

* * * * *